H. PARKER.
Wagon.
No. 71,406. Patented Nov. 26, 1867.
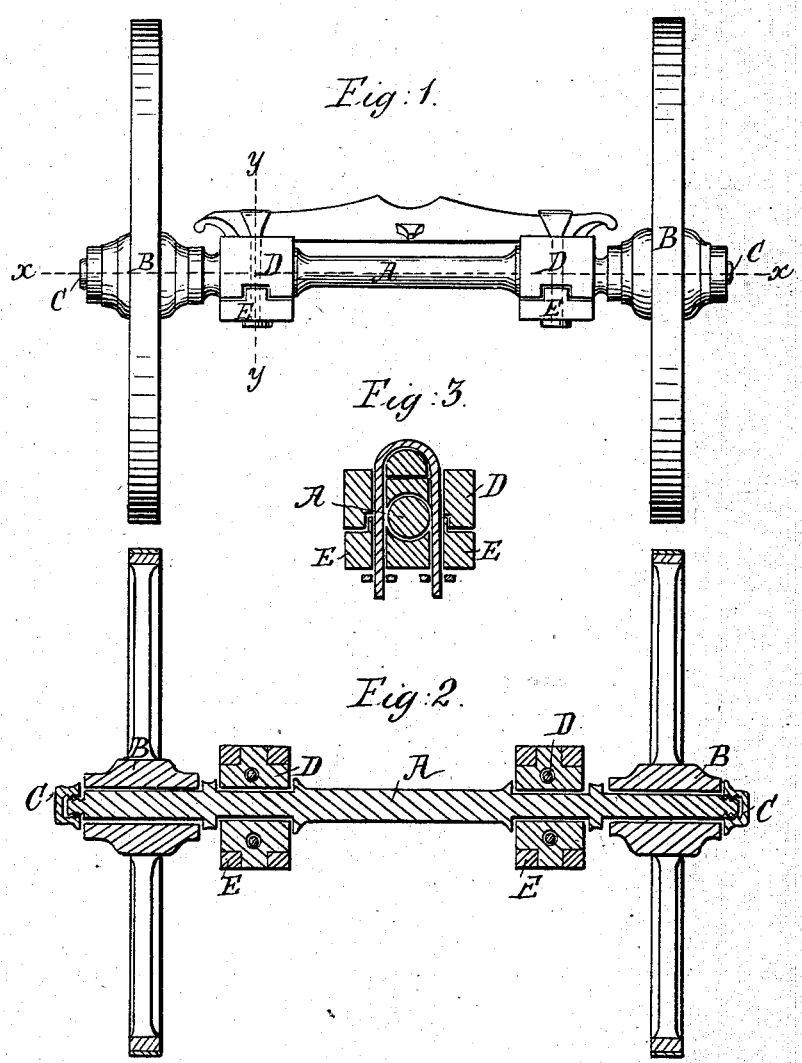

United States Patent Office.

HENRY PARKER, OF LEESBURG, MISSISSIPPI.

Letters Patent No. 71,406, dated November 26, 1867.

IMPROVEMENT IN WAGONS.

The Schedule referred to in these Letters Patent and making part of the same.

TO ALL WHOM IT MAY CONCERN:

Be it known that I, HENRY PARKER, of Leesburg, Davis county, Mississippi, have invented new and useful Improvements in Wagons; and I do hereby declare that the following is a full, clear, and exact description thereof, which will enable others skilled in the art to make and use the same, reference being had to the accompanying drawings, forming part of this specification.

The present improvements are applicable to wheel-barrows, carts, drays, wagons, railroad-cars, &c., and consists principally in the application of a round revolving axle and bed-plate; also in finishing both sides of the wheel-hubs and boxes similar to each other.

The axles are turned off of a uniform size, with flanges to adjust the wheels to their proper places, on which axle nuts are screwed for securing the wheels, as in ordinary vehicles. In the accompanying plate of drawings my improvements in wagons are illustrated—

Figure 1 being an elevation of one axle with its wheels and other parts.

Figure 2, a section, taken in the plane of the line $x\ x$, fig. 1, and

Figure 3 a transverse section, taken in the plane of the line $y\ y$, fig. 1.

Similar letters of reference indicate corresponding parts.

A, in the drawings, represents an axle for a wagon. This axle is turned off of a uniform size, or nearly so, with flanges $a$, to adjust the wheels B to their proper places thereon at each end. C, nuts to secure the wheels B, as in ordinary vehicles. Near the shoulders, on the axle for the catch-wheel, are confined, between shoulders $b$ of the axle, bearing-boxes D, in which boxes the axles revolve. These boxes are formed of two parts, the one, the box proper, and the other, the bed-plates E, to which they are secured by bolts, or other suitable means, and in such manner, by slots and flanges, as not to slip, the one upon the other. The upper part of the box or box proper is slotted or grooved parallel with its bearings, so as to receive the bed-plate, at the same time leaving that part of the box of sufficient thickness to admit of the necessary fastenings of the stays and braces to the under side of the bed-plate, and not to conflict with the revolving of the axles in the boxes. Attached to the boxes by a projection an aperture is in front for the reception of the shafts, tongue, &c., as in ordinary carriages. The bed-plate is similar in its functions to that of ordinary carriages, and is intended to be similarly geared. The bed-plate should be of hard wood, strapped on the bottom with iron, to prevent the cut and wear of its attachment. The bed-plate and boxes are secured permanently by means of a clip or clips passed across the bed-plate down through each side of the boxes, and there secured by nuts at the bottom. The clips, bed-plate, bar, and the upper half of the box should be perforated, to admit of oiling, and these openings provided with flaps, to prevent sand, dust, or other materials from passing into the boxes of the bed-plate. Both sides of the wheel-hubs, and bands, and boxes are furnished alike, so as to admit of the reversal of the wheel should it chance to become sprung inward, the body thereby overcoming the difficulty of wheels springing the wrong way. The axle is free to revolve in the wheels and bed-plate boxes, and it is intended to and only does revolve in the bed-plate boxes in cases of a curve, in which case the wheels revolve sufficient to make the distance without slipping or sliding, as in case of car-wheels permanently attached to axles.

Having thus described my invention, what I claim as new, and desire to secure by Letters Patent, is—

The round revolving axle, with its attachings all combined. substantially as and for the purpose described.

HENRY PARKER.

Witnesses:
 JOEL E. WELBORN,
 M. B. WELBORN.